United States Patent
Kwon et al.

(10) Patent No.: US 8,753,763 B2
(45) Date of Patent: Jun. 17, 2014

(54) FLEXIBLE BATTERY AND FLEXIBLE ELECTRONIC DEVICE INCLUDING THE SAME

(71) Applicant: Samsung Electronics Co., Ltd., Suwon-si (KR)

(72) Inventors: Moon-seok Kwon, Hwaseong-si (KR); Han-su Kim, Seoul (KR); Young-min Choi, Suwon-si (KR); Jae-man Choi, Hwaseong-si (KR); Seung-sik Hwang, Seongnam-si (KR); Min-sang Song, Seongnam-si (KR); Jeong-kuk Shon, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/938,420

(22) Filed: Jul. 10, 2013

(65) Prior Publication Data

US 2013/0295431 A1    Nov. 7, 2013

Related U.S. Application Data

(63) Continuation of application No. 13/088,589, filed on Apr. 18, 2011, now Pat. No. 8,507,123.

(30) Foreign Application Priority Data

Nov. 16, 2010   (KR) .................... 10-2010-0113901

(51) Int. Cl.
*H01M 2/02* (2006.01)

(52) U.S. Cl.
USPC .......................................... 429/127

(58) Field of Classification Search
None
See application file for complete search history.

(56) References Cited

U.S. PATENT DOCUMENTS

| | | |
|---|---|---|
| 5,326,652 A | 7/1994 | Lake |
| 6,291,098 B1 | 9/2001 | Shibuya et al. |
| 6,559,659 B2 | 5/2003 | Cuming |
| 6,699,622 B2 | 3/2004 | Kezuka et al. |
| 6,753,113 B2 | 6/2004 | Hara et al. |
| 7,074,522 B2 | 7/2006 | Kezuka et al. |
| 2007/0009794 A1 | 1/2007 | Takami |

FOREIGN PATENT DOCUMENTS

| | | |
|---|---|---|
| JP | 02-207461 A | 8/1990 |
| JP | 2698145 B | 9/1997 |
| JP | 2570162 Y2 | 2/1998 |
| JP | 2001-118605 A | 4/2001 |
| JP | 2002-343340 A | 11/2002 |
| JP | 2005063958 | 3/2005 |
| JP | 2005-129234 A | 5/2005 |
| JP | 2007066806 A | 3/2007 |
| JP | 2008146974 A | 6/2008 |

(Continued)

OTHER PUBLICATIONS

Korean Office Action with English Translation for Application No. 10-2010-0113901 dated Apr. 5, 2012.

*Primary Examiner* — Patrick Ryan
*Assistant Examiner* — Wyatt McConnell
(74) *Attorney, Agent, or Firm* — Cantor Colburn LLP

(57) ABSTRACT

A flexible battery and a flexible electronic device including the flexible battery as a power source. The flexible battery includes a cell stack comprising a plurality of unit cells, and an external casing sealing the cell stack, wherein each of the unit cells comprises a negative electrode, a positive electrode, an electrolyte layer disposed between the negative electrode and the positive electrode, and a first polymer film at least partially surrounding the negative electrode, the positive electrode, and the electrolyte layer.

21 Claims, 2 Drawing Sheets

(56) References Cited

FOREIGN PATENT DOCUMENTS

| KR | 1998-071683 A | 10/1998 |
|----|----|----|
| KR | 1020000064499 A | 11/2000 |
| KR | 1020010089233 A | 9/2001 |
| KR | 1020010107731 A | 12/2001 |
| KR | 1020020017944 A | 3/2002 |
| KR | 1020020017973 A | 3/2002 |
| KR | 10-0767196 B1 | 10/2007 |

FLEXIBLE BATTERY AND FLEXIBLE ELECTRONIC DEVICE INCLUDING THE SAME

CROSS-REFERENCE TO RELATED APPLICATIONS

This application is a continuation of U.S. patent application Ser. No. 13/088,589, filed on Apr. 18, 2011, which claims priority to and the benefit of Korean Patent Application No. 10-2010-0113901, filed on Nov. 16, 2010 in the Korean Intellectual Property Office, and all the benefits accruing therefrom under 35 U.S.C. §119, the contents of which are incorporated herein by reference in their entirety.

BACKGROUND

1. Field

Aspects of the present disclosure relate to a flexible battery and a flexible electronic device including the same, and more particularly, to a flexible battery including a plurality of unit cells that are in sliding contact with each other as well as a flexible electronic device including the flexible battery as a power source.

2. Description of the Related Art

Typical batteries do not have sufficient flexibility even when they include a flexible electrode and/or a flexible external casing, so it is difficult to bend the batteries. Also, even if such typical batteries can be bent, their performance considerably deteriorates.

JP 2,570,162 discloses an electrode having a structure in which active material particles are fixed on a current collector by a conductive adhesive layer. In such an electrode, the active material particles are not easily detached from the current collector even though the electrode is bent. JP 2,698,145 discloses a thin secondary battery including a sheet electrode including a rubber-like porous sheet with which a conducting agent is mixed and a conductive polymer synthesized in voids in the porous sheet. Since such an electrode includes the rubber-like porous sheet, the electrode has excellent flexibility. JP 2002-343340 discloses an electrode having high flexibility due to designed holes formed in a positive active material layer. However, the foregoing documents only disclose techniques of preventing detachment of an active material layer caused by bending of an electrode of a battery or only disclose improving flexibility of an electrode without improving flexibility of the entire battery. In addition, the foregoing documents cannot provide means of maintaining uniform contacts between a positive electrode and a negative electrode, and/or uniform alignments thereof to perform stable electrochemical reactions when the batteries are bent.

KR 2002-0017973 discloses a battery including an electrode formed on a current collector that incorporates carbon fiber and a metal thin film in sliding contact with the electrode, in which the battery structure is sealed under reduced pressure in an external casing. In this case, while flexibility of the battery is improved by the sliding contact, flexibility is not sufficiently improved because friction between the carbon fiber current collector and the metal thin film is not sufficiently low and the battery structure is sealed under the reduced pressure. In addition, if the battery is repeatedly folded and unfolded, the contact between the carbon fiber current collector and the metal thin film may lose uniformity, thereby leading to deterioration of the battery performance.

Furthermore, a battery is generally prepared by stacking or winding a thin electrode and other elements of the battery to obtain sufficient capacity according to the purpose for use. However, if the thickness of the battery increases, flexibility of the battery decreases, making it difficult to bend the battery.

SUMMARY

According to an aspect of the present invention, a flexible battery including a plurality of unit cells that are in sliding contact with each other is provided.

According to an aspect of the present invention, a flexible electronic device including the flexible battery as a power source is provided.

According to an aspect of the present invention, a flexible battery includes: a cell stack including a plurality of unit cells; and an external casing sealing the cell stack, wherein each of the unit cells includes: a negative electrode; a positive electrode; an electrolyte layer disposed between the negative electrode and the positive electrode; and a first polymer film at least partially surrounding the negative electrode, the positive electrode, and the electrolyte layer.

According to an aspect of the present invention, at least one portion of the unit cells facing the external casing may be free of the external casing.

According to an aspect of the present invention, the external casing may be a moisture-proof multi-layered film including a second polymer film and a metal layer.

According to an aspect of the present invention, the negative electrode may include a negative current collector and a negative active material layer disposed on a surface of the negative current collector, and the positive electrode may include a positive current collector and a positive active material layer disposed on a surface of the positive current collector.

According to an aspect of the present invention, the negative current collector may include at least one metal selected from the group consisting of copper (Cu), stainless steel, nickel (Ni), aluminum (Al), and titanium (Ti), and the positive current collector includes at lest one metal selected from the group consisting of aluminum (Al), stainless steel, titanium (Ti), copper (Cu), and silver (Ag).

According to an aspect of the present invention, the negative current collector and the positive current collector may be in contact with the first polymer film.

According to an aspect of the present invention, the flexible battery may further include terminal wires electrically connecting the plurality of unit cells in series, wherein the terminal wires extend out of the external casing.

According to an aspect of the present invention, the flexible battery may further include terminal wires electrically connecting the plurality of unit cells in parallel, wherein the terminal wires extend out of the external casing.

According to an aspect of the present invention, the flexible battery may include a lithium secondary battery.

According to an aspect of the present invention, each of the unit cells may be respectively sealed by the first polymer film and the flexible battery may further include terminal wires contacting with at least one of the positive electrode and negative electrode of each of the unit cells and extending out of the external casing.

According to an aspect of the present invention, the internal pressure of the flexible battery may be the same as the ambient air pressure.

According to an aspect of the present invention, the flexible battery may further include a separator between the negative electrode and the positive electrode.

According to an aspect of the present invention, the first polymer film may be at least partially adhered to the separator.

According to an aspect of the present invention, the flexible battery may further include an electrolyte between the first polymer film and the external casing.

According to an aspect of the present invention, the first polymer film may have a thickness in a range of about 1 to about 50 µm.

According to an aspect of the present invention, the first polymer film may include a thermoplastic resin having a melting point in a range of about 70 to about 200° C.

According to an aspect of the present invention, the first polymer film may include an elongated film.

According to an aspect of the present invention, the first polymer film may include a polypropylene resin.

According to an aspect of the present invention, the first polymer film may be laminated on the surface of at least one of the negative electrode and the positive electrode.

According to another aspect of the present invention, a flexible electronic device includes the flexible battery as a power source.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
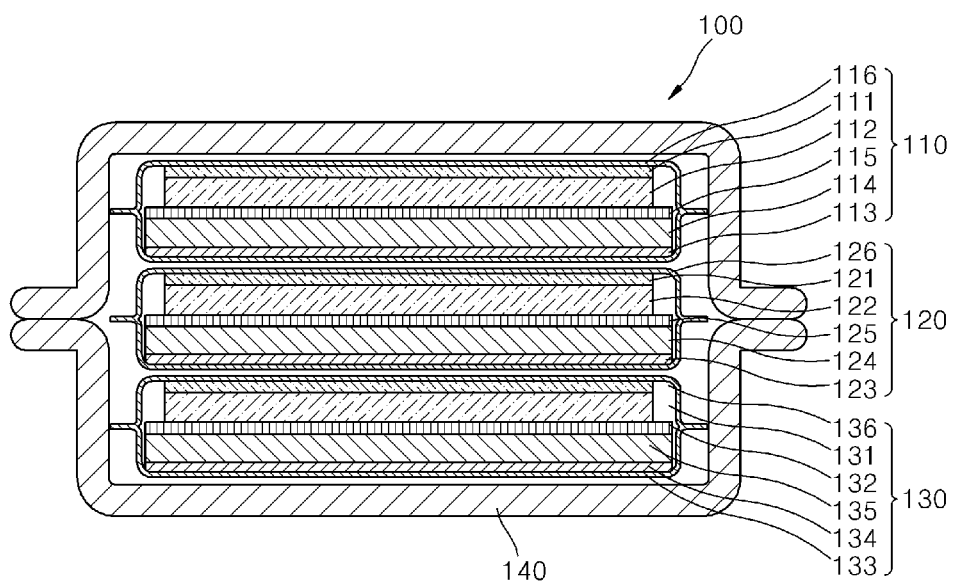
FIG. 1 is a schematic cross-sectional view of a flexible battery according to an embodiment of the present invention.

Reference will now be made in detail to the present embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below in order to explain the present invention by referring to the figures.

Referring to FIG. 1, a flexible battery 100 according to an embodiment of the present invention includes a cell stack including a plurality of unit cells 110, 120 and 130 and an external casing 140 sealing the cell stack. For example, the flexible battery 100 may be a lithium secondary battery. Hereinafter, embodiments of the present invention will be described with reference to a lithium secondary battery as the flexible battery 100, but the present invention is not limited thereto.

The unit cell 110 includes a negative electrode 111+112, a positive electrode 113+114, an electrolyte layer 115, and a first polymer film 116, the unit cell 120 includes a negative electrode 121+122, a positive electrode 123+124, an electrolyte layer 125 and a first polymer film 126, and the unit cell 130 includes a negative electrode 131+132, a positive electrode 133+134, an electrolyte layer 135 and a first polymer film 136.

The negative electrode 111+112 includes a negative current collector 111 and a negative active material layer 112 disposed on the surface of the negative current collector 111, the negative electrode 121+122 includes a negative current collector 121 and a negative active material layer 122 disposed on the surface of the negative current collector 121, and the negative electrode 131+132 includes a negative current collector 131 and a negative active material layer 132 disposed on the surface of the negative current collector 131.

The negative current collectors 111, 121 and 131 may each include at least one metal selected from the group consisting of copper (Cu), stainless steel, nickel (Ni), aluminum (Al) and titanium (Ti).

The negative current collectors 111, 121 and 131 may each contact with the first polymer films 116, 126 and 136, respectively.

The negative active material layers 112, 122 and 132 may each include a negative active material, a binder and a conductive agent, although they are not shown in FIG. 1.

Any negative active material which may form an alloy with lithium or any negative active material in which lithium ions are reversibly intercalatable and deintercalatable may be used without limitation. For example, the negative active material may include at least one material selected from the group consisting of a metal, a carbonaceous material, a metal oxide and a lithium metal nitride. The carbonaceous material may include at least one material selected from the group consisting of graphite, vapor growth carbon fiber, coke, mesocarbon microbeads (MCMB), polyacene, pitch-based carbon fiber and hard carbon. The metal oxide may include at least one oxide selected from the group consisting of lithium titanium oxide ($Li_4Ti_5O_{12}$), titanium(IV) oxide, molybdenum(IV) oxide, niobium(V) oxide, iron(III) oxide, tungsten(IV) oxide, tin(II) oxide, amorphous tin composite oxide, silicon(II) monoxide, cobalt(II) oxide and nickel(II) oxide. The metal may include at least one metal selected from the group consisting of lithium (Li), silicon (Si), magnesium (Mg), calcium (Ca), aluminum (Al), germanium (Ge), tin (Sn), lead (Pb), arsenic (As), antimony (Sb), bismuth (Bi), silver (Ag), gold (Au), zinc (Zn), cadmium (Cd), mercury (Hg), copper (Cu), iron (Fe), nickel (Ni), cobalt (Co) and indium (In). The lithium metal nitride may include $Li_{2.6}Co_{0.4}N_3$.

The binder may include at least one polymer selected from the group consisting of a vinylidene fluoride/hexafluoropropylene copolymer, polyvinylidene fluoride, polyacrylonitrile, polymethylmethacrylate, polytetrafluoroethylene and a styrene butadiene rubber (SBR) based polymer.

The conductive agent may include at least one material selected from the group consisting of: carbonaceous conductive agents such as carbon black, carbon fiber and graphite; conductive fibers such as metallic fibers; non-metallic powders such as carbon monofluoride (CF) powder; metallic powders such as aluminum powder and nickel powder; conductive whiskers such as zinc oxide and potassium titanate; conductive metal oxides such as titanium oxide; and polyphenylene derivatives. The carbon black may be selected from the group consisting of acetylene black, channel black, furnace black, lamp black and thermal black. The graphite may be natural or artificial graphite.

The positive electrode 113+114 includes a positive current collector 113 and a positive active material layer 114 disposed on the surface of the positive current collector 113, the positive electrode 123+124 includes a positive current collector 123 and a positive active material layer 124 disposed on the surface of the positive current collector 123, and the positive electrode 133+134 includes a positive current collector 133 and a positive active material layer 134 disposed on the surface of the positive current collector 133.

The positive current collectors 113, 123 and 133 each may include at least one metal selected from the group consisting of aluminum (Al), stainless steel, titanium (Ti), copper (Cu) and silver (Ag).

The positive current collectors 113, 123 and 133 each may contact with the first polymer films 116, 126 and 136, respectively.

The positive active material layers 114, 124 and 134 each may include a positive active material, a binder and a conductive agent although they are not shown in FIG. 1.

Any positive active material in which lithium ions are reversibly intercalatable and deintercalatable may be used without limitation. For example, the positive active material may include at least one material selected from the group consisting of lithium transition metal oxides such as lithium cobalt oxides ($LiCoO_2$), lithium nickel oxides ($LiNiO_2$), lithium nickel cobalt oxides, lithium nickel cobalt aluminum oxides, lithium nickel cobalt manganese oxides, lithium manganese oxides ($LiMn_2O_4$), lithium manganese phosphates ($LiMnPO_4$) and lithium iron phosphates ($LiFePO_4$); nickel sulfides ($Ni_3S_2$, $NiS$, $Ni_7S_6$); copper sulfides ($CuS$, $Cu_2S$); sulfur; iron oxides ($Fe_2O_3$, $Fe_3O_4$); and vanadium oxides ($VO$, $VO_2$, $V_2O_5$).

The binder and the conductive agent may respectively be the same as those included in the negative active material layers 112, 122 and 132.

Separators (not shown) may respectively be interposed between the negative electrode 111+112 and the positive electrode 113+114, between the negative electrode 121+122 and the positive electrode 123+124, and/or between the negative electrode 131+132 and the positive electrode 133+134.

The separators may be a polyethylene (PE) film or a polypropylene (PP) film, and may be prepared in the form of a woven fabric or a non-woven fabric.

Each of the first polymer films 116, 126 and 136 may be partially (i.e. locally) adhered to the separators, respectively. In other words, relative positions of the negative electrodes 111+112, 121+122 and 131+132, the positive electrodes 113+114, 123+124 and 133+134 and the separators contained in each of the unit cells 110, 120 and 130 should be fixed even when the flexible battery 100 is repeatedly folded and unfolded. Thus, each of the first polymer films 116, 126 and 136 should be partially respectively adhered to the separators, to fix relative positions of the elements.

The electrolyte layers 115, 125 and 135 each may include an organic liquid electrolyte and/or a solid electrolyte.

The organic liquid electrolyte may be a solution prepared by dissolving a lithium salt in an organic solvent.

The organic solvent may be selected from the group consisting of propylene carbonate, ethylene carbonate, fluoroethylene carbonate, 1,2-butylene carbonate, trans-2,3-butylene carbonate, dimethyl carbonate, diethyl carbonate, ethyl methyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether and any combination thereof.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), $LiCl$, $LiI$, and any combination thereof.

The solid electrolyte may be boron oxide, lithium oxynitride, or the like. The solid electrolyte may be formed on the negative electrode or positive electrode by using, for example, a sputtering method.

In addition, the electrolyte layers 115, 125 and 135 each may include a polymer electrolyte prepared by filling a mixture including at least one monomer and an organic liquid electrolyte in each of the unit cells 110, 120 and 130 and curing the monomer.

The first polymer film 116 at least partially surrounds the negative electrode 111+112, the positive electrode 113+114 and the electrolyte layer 115; the first polymer film 126 at least partially surrounds the negative electrode 121+122, the positive electrode 123+124 and the electrolyte layer 125; and the first polymer film 136 at least partially surrounds the negative electrode 131+132, the positive electrode 133+134 and the electrolyte layer 135.

Figure 2:
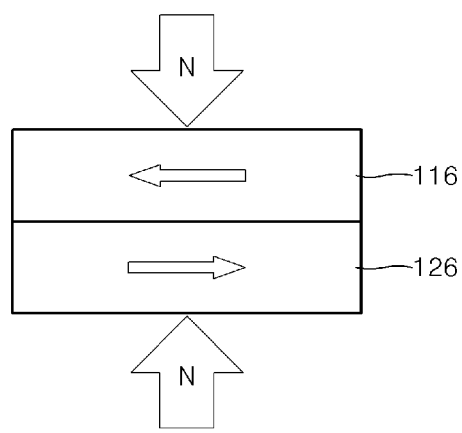
FIG. 2 is a schematic diagram for describing sliding contact between first polymer films of adjacent unit cells of FIG. 1.

When a normal force N is applied to the flexible battery 100 as shown in FIG. 2, the first polymer film 126 is in sliding contact with adjacent first polymer film 116 and another first polymer film 136 of FIG. 1 to provide flexibility to the flexible battery 100, so that breaking of the flexible battery 100 may be prevented. That is, the first polymer film 126 easily slides on the surfaces of the adjacent first polymer films 116 and 136 when it contacts with the adjacent first polymer films 116 and 136 due to a low friction coefficient μ of each of the contact surfaces between the first polymer films 126 and 116, and between the first polymer films 126 and 136. In addition, the first polymer film 116 allows the negative electrode 111+112 and the positive electrode 113+114, which are disposed at both sides of the electrolyte layer 115, to closely contact each other when the flexible battery 100 is repeatedly folded and unfolded, so that relative positions of the negative electrode 111+112 and the positive electrode 113+114, i.e., the distance therebetween, may be stably maintained to obtain stable battery performance. The first polymer films 126 and 136 may have the same characteristics and function as the first polymer film 116.

Referring to FIG. 2, friction F between the first polymer film 116 and the first polymer film 126 may satisfy Equation 1 below.

$$F = \mu N \quad \quad \text{<Equation 1>}$$

In Equation 1, N is a normal force applied to the first polymer film 116 and the first polymer film 126, and μ is the friction coefficient of the contact surface.

Referring to Equation 1, the normal force N and/or the friction coefficient μ should be reduced in order to reduce the friction F.

Since a typical battery does not include elements corresponding to the first polymer films 116, 126 and 136, in order to obtain stable battery performance, a negative electrode and a positive electrode disposed at both sides of the electrolyte layer are designed to closely contact each other by reducing the internal pressure of the battery to be less than the surrounding air pressure by packing the battery under reduced pressure. However, the normal force N applied to unit cells increases while packing the battery under the reduced pressure, and thus friction increases on contact surfaces between the unit cells, thereby reducing flexibility of the entire battery.

However, the flexible battery 100 according to an embodiment of the present invention may be one packed under reduced pressure or at atmospheric pressure. Even though the internal pressure of the flexible battery 100 packed at atmospheric pressure is substantially the same as the surrounding air pressure (e.g., atmospheric pressure), the same effect as that obtained when a typical battery is packed under the reduced pressure (i.e., stable battery performance) may be obtained by using the first polymer films 116, 126 and 136. Also, friction F among the unit cells 110, 120 and 130 may be reduced due to a low friction coefficient μ between the first polymer film 116 and the first polymer film 126 and between the first polymer film 126 and the first polymer film 136. In addition, when the flexible battery 100 is packed at atmospheric pressure, the normal force N among the unit cells 110, 120 and 130 is reduced to further reduce friction F among the unit cells 110, 120 and 130. As the friction F decreases, flexibility of the flexible battery 100 increases.

Each of the first polymer films 116, 126 and 136 may have a thickness in the range of about 1 to about 50 μm. If the thickness of the first polymer films 116, 126 and 136 is within the range described above, each of the unit cells 110, 120 and 130 has sufficient physical strength and binding force, and the thickness of the flexible battery 100 is not considerably increased by the first polymer films 116, 126 and 136.

The first polymer films 116, 126 and 136 may respectively include a thermoplastic resin having a melting point in the range of about 70 to about 200° C. If the melting point is within the range described above, elements of the flexible battery 100 may be bonded using heat when the flexible battery 100 is prepared, and deterioration of the elements of the flexible battery 100 caused by operations at high temperature may be prevented.

In addition, each of the first polymer films 116, 126 and 136 may include an elongated film. The first polymer films 116, 126 and 136 may include at least one polymer selected from the group consisting of polypropylene resin, polyurethane resin, silane-terminated polymer, silicone, unsaturated polyester resin, vinyl ester resin, acrylate, polyvinyl acetate, polyvinyl alcohol, polyvinyl ether, ethylene vinyl acetate, ethylene acrylic acid copolymer, polystyrene, polyvinyl chloride, styrene-butadiene rubber, chloroprene rubber, nitrile rubber, butyl rubber, polysulfide, polyethylene, fluorinated hydrocarbon, phenol-formaldehyde resin, liquid crystal polymer, nylon, polyamide, polyimide, polyethylene terephthalate, cellulose, polymethylmethacrylate, polyolefin, polyester, cresol-formaldehyde novolac resin, cresol-formaldehyde epoxy resin, resorcinol-formaldehyde resin, urea-formaldehyde resin, melamine-formaldehyde resin, polybenzimidazole, polyamide-imide and polysulfone. For example, the first polymer films 116, 126 and 136 may be polypropylene resin.

The first polymer film 116 may be laminated on the surface of at least one of the negative electrode 111+112 and the positive electrode 113+114, the first polymer film 126 may be laminated on the surface of at least one of the negative electrode 121+122 and the positive electrode 123+124, the first polymer film 136 may be laminated on the surface of at least one of the negative electrode 131+132 and the positive electrode 133+134.

The external casing 140 may be a moisture-proof multi-layered film including a second polymer film (not shown) and a metal layer (not shown). For example, the external casing 140 may include a metal layer such as an aluminum thin film and a pair of the second polymer films disposed at both sides of the metal layer. The second polymer film may be the same as or different from the first polymer films 116, 126 and 136. For example, the second polymer film may include at least one polymer selected from the group consisting of nylon, polyamide, polyimide, polyethylene terephthalate, polyester, polyurethane, polypropylene and polyethylene.

At least one portion of the unit cells 110, 120 and 130 facing the external casing 140 may not be free of the external casing 140. In other words, the unit cells 110, 120 and 130 should not be entirely adhered to the external casing 140 since sliding occurs among the unit cells 110, 120 and 130 and between each of the unit cells 110, 120 and 130, and the external casing 140. The unit cells 110, 120 and 130 should partially be adhered to the external casing 140 in order to fix the relative positions of the unit cells 110, 120 and 130 while the flexible battery 100 repeatedly moves.

An electrolyte that is the same or different electrolyte as that included in the electrolyte layers 115, 125 and 135 may further be disposed between the first polymer films 116, 126 and 136 and the external casing 140. For example, an organic liquid electrolyte may be disposed in each of the unit cells 110, 120 and 130 and between the first polymer films 116, 126 and 136 and the external casing 140. Alternatively, a polymer electrolyte may be disposed in each of the unit cells 110, 120 and 130, and an organic liquid electrolyte may be disposed between the first polymer films 116, 126 and 136 and the external casing 140. If the flexible battery 100 is not packed under the reduced pressure, a fluid is filled between the first polymer films 116, 126 and 136 disposed in the external casing 140 and the external casing 140. The performance of the flexible battery 100 may be stably maintained when the fluid is an electrolyte rather than air.

The flexible battery 100 having the structure described above may further include terminal wires (not shown) electrically connecting the unit cells 110, 120 and 130 in series, and the terminal wires may extend out of the external casing 140.

Alternatively, the flexible battery 100 may further include terminal wires (not shown) electrically connecting the unit cells 110, 120 and 130 in parallel, and the terminal wires may extend out of the external casing 140.

Alternatively, the flexible battery 100 may include unit cells 110, 120 and 130 respectively sealed by the first polymer films 116, 126 and 136 and terminal wires (not shown) that contact at least one of the positive electrode and negative electrode of the unit cells 110, 120, and 130 and extend out of the external casing 140.

According to an embodiment of the present invention, the flexible battery 100 which has excellent flexibility and in which stable electrochemical reactions occur even when the flexible battery 100 is repeatedly bent may be provided by including a plurality of unit cells 110, 120, and 130 that are in sliding contact with each other.

The flexible battery 100 may be used as a power source for flexible electronic devices such as smart devices, electronic books, body-attached electronic devices, or medical devices.

Hereinafter, one or more embodiments of the present invention will be described in detail with reference to the following examples. However, these examples are not intended to limit the purpose and scope of the one or more embodiments of the present invention.

EXAMPLES

Example 1

Preparation Example 1

Preparation of Original Plate of Negative Electrode

A negative active material (graphite) was dispersed in an aqueous solution in which a binder (carboxymethyl cellulose and styrene butadiene rubber) is dissolved to prepare a negative active material slurry. In this regard, the ratio of the negative active material, carboxymethyl cellulose, and styrene butadiene rubber was 96:2:2 based on the weight percent. Then, the negative active material slurry was coated on a Cu current collector having a thickness of 8 μm, dried, and rolled to prepare an original plate of a negative electrode.

Preparation Example 2

Preparation of Original Plate of Positive Electrode

A positive active material ($LiCoO_2$) and a conductive agent (DENCA® acetylene black, Denki Kagaku Kogyo Kabushiki Kaisha Corp.) were dispersed in a solution prepared by dissolving a polyvinylidene fluoride binder in N-methyl-2-pyrrolidone to prepare positive active material slurry. In this regard, the ratio of the positive active material, the conductive agent, and the binder was 90:5:5 based on the weight percent. Then, the positive active material slurry was coated on an Al current collector having a thickness of 15 μm, dried, and rolled to prepare an original plate of a positive electrode.

Preparation Example 3

Preparation of Battery (Packed Under Reduced Pressure)

The original plate of the negative electrode prepared according to Preparation Example 1 was cut into 12 mm×52 mm pieces to prepare a negative electrode. In addition, the original plate of the positive electrode prepared according to Preparation Example 2 was cut into 10 mm×50 mm pieces to prepare a positive electrode. Then, the negative electrode and the positive electrode were disposed at both sides of a cellulose separator (NKK Corporation) having a thickness of about 37 μm to face each other, and the negative electrode, the positive electrode and the separator were wrapped with a polypropylene film having a thickness of 19 μm to prepare a unit cell. Four more unit cells were prepared in the same manner, and the prepared five unit cells were stacked to prepare a cell stack. Then, the unit cells were electrically connected to one another in parallel. Then, the cell stack was put in a film external casing (DNP Corporation, including an aluminum film) for a lithium ion battery having a thickness of 120 μm, and three sides of the external casing were sealed. Then, 1.3 M $LiPF_6$ solution, which is an electrolyte prepared by dissolving $LiPF_6$ in a mixed solvent including 30 vol % of ethylene carbonate and 70 vol % of diethylene carbonate, was injected into the external casing using a pipette. Then, the battery was packed under reduced pressure using a vacuum sealer (Howden Food Equipment B. V.). In detail, the battery was packed by heat in a chamber of the vacuum sealer (chamber pressure: about 0.0 bar), which is evacuated by a vacuum pump driven for 40 seconds.

Example 2

A battery was prepared in the same manner as in Example 1, except that the cell stack was packed in the external casing at atmospheric pressure.

Comparative Example

The negative active material slurry prepared according to Example 1 was coated on both surfaces of a Cu current collector, dried, and rolled to prepare a negative electrode, and the positive active material slurry prepared according to Example 1 was coated on both surfaces of an Al current collector, dried, and rolled to prepare a positive electrode. Then, the prepared positive electrode, the same composition separator as that used in Example 1, and the prepared negative electrode, and the same composition separator as that used in Example 1 were sequentially stacked and wound in a jelly-roll type, and both sides of the stack were pressed to have a width of 12 mm. Then, the jelly-roll type battery, which was not wrapped with the polypropylene film, was packed under reduced pressure in the external casing (DNP Corporation, including Al film) in the same manner as in Example 1 to prepare a battery.

Comparative Example 2

A battery was prepared in the same manner as in Example 1, except that unit cells and a cell stack were prepared without wrapping the positive electrode, the negative electrode, and the separator with the polypropylene film.

Comparative Example 3

A battery was prepared in the same manner as in Example 1, except that unit cells and a cell stack were prepared without wrapping the positive electrode, the negative electrode, and the separator with the polypropylene film, and the prepared cell stack was packed at atmospheric pressure in the external casing.

Evaluation Examples

Initial capacity, flexibility, capacity retentions after bending the batteries 100 times, and appearance changes after bending the batteries 100 times were evaluated. The batteries evaluated were those prepared according to Examples 1 and 2 and Comparative Examples 1 to 3. The results are shown in Table 1 below.

Evaluation Example 1

Evaluation of Initial Capacity of Battery

Each of the batteries was charged at a rate (C-rate) of 0.1 C (mA/g) until the voltage of the battery reached 4.4 V, and then further charged with a constant voltage of 4.4 V until the current of the battery reached 0.05 C. Then, the battery was rested for 10 minutes, and then the battery was discharged at a rate of 0.1 C until the voltage of the battery reached 2.8 V. In this regard, the discharge capacity of the first cycle refers to an initial capacity.

Evaluation Example 2

Evaluation of Flexibility of Battery

Each of the batteries was put horizontally on an experiment stand having a height of 10 cm, such that only a portion corresponding to a length of 10 mm from one end of the battery was supported by the experiment stand, and the portion of the battery supported by the experiment stand was pressed to be fixed to the experiment stand. Then, a pendulum of 17 g was hung on the other end of the battery that was not fixed, and the displacement from the horizontal position toward the gravity direction was measured. As the displacement increases, the flexibility of the battery increases.

Evaluation Example 3

Evaluation of Capacity Retention of Battery after 100 Times of Bending

Each of the batteries was bent 100 times by closely contacting the battery with a cylindrical structure having a diameter of 100 mm to perform a flexibility test that limits the curvature radius of the bent battery to 50 mm. Then, the battery was charged and discharged in the same manner as in Evaluation Example 1 to evaluate discharge capacity. The ratio of the discharge capacity to the initial capacity measured in Evaluation Example 1 refers to capacity retention.

Evaluation Example 4

Evaluation of Appearance Change of Battery after 100 Times of Bending

A flexibility test was conducted in the same manner as Evaluation Example 3, and then appearance changes of the battery were observed with naked-eyes.

TABLE 1

|  | Initial capacity [mAh/g] | Flexibility (mm) | Capacity retention after 100 times of bending(%) | Appearance changes after 100 times of bending |
|---|---|---|---|---|
| Example 1 | 77.368 | 11 | 100 | None |
| Example 2 | 77.329 | 13 | 98.3 | None |
| Comparative Example 1 | 78.142 | 2 | 96.7 | Completely bent in some areas |
| Comparative Example 2 | 77.779 | 2 | 71.8 | Completely bent in some areas |
| Comparative Example 3 | 76.634 | 12 | 38.3 | None |

Referring to Table 1, the batteries prepared according to Examples 1 and 2 had better flexibility and capacity retentions after repeated bending and showed no appearance changes after repeated bending compared to the batteries prepared according to Comparative Examples 1 and 2. The battery prepared according to Comparative Example 3 had excellent flexibility and showed no appearance changes after repeated bending, but had very low capacity retention after repeated bending.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flexible battery comprising:
a cell stack comprising a plurality of unit cells, wherein each of the unit cells comprises:
a negative electrode,
a positive electrode,
an electrolyte layer disposed between the negative electrode and the positive electrode, and
a first polymer film surrounding the negative electrode, the positive electrode, or the electrolyte layer; and
an external casing sealing the cell stack,
wherein the plurality of unit cells are in sliding contact with each other, and
wherein the flexible battery has a flexibility of 11 mm to 13 mm when a 12 mm by 42 mm portion is deflected under a 17 g load.

2. The flexible battery of claim 1, wherein at least one portion of the unit cells facing the external casing is free of the external casing.

3. The flexible battery of claim 1, wherein the external casing is a moisture-proof multi-layered film comprising a second polymer film and a metal layer.

4. The flexible battery of claim 1, wherein:
the negative electrode further comprises a negative current collector and a negative active material layer disposed on a surface of the negative current collector, and
the positive electrode further comprises a positive current collector and a positive active material layer disposed on a surface of the positive current collector.

5. The flexible battery of claim 4, wherein:
the negative current collector is at least one metal selected from the group consisting of copper (Cu), stainless steel, nickel (Ni), aluminum (Al), and titanium (Ti), and
the positive current collector is at least one metal selected from the group consisting of aluminum (Al), stainless steel, titanium (Ti), copper (Cu), and silver (Ag).

6. The flexible battery of claim 4, wherein the negative current collector and the positive current collector contact the first polymer film.

7. The flexible battery of claim 4, further comprising terminal wires electrically connecting the plurality of unit cells in series, wherein the terminal wires extend out of the external casing.

8. The flexible battery of claim 4, further comprising terminal wires electrically connecting the plurality of unit cells in parallel, wherein the terminal wires extend out of the external casing.

9. The flexible battery of claim 1, wherein the flexible battery comprises a lithium secondary battery.

10. The flexible battery of claim 1, wherein:
each of the unit cells is respectively sealed by the first polymer film,
terminal wires contact at least one of the positive electrode and negative electrode of each of the unit cells, and
the terminal wires extend out of the external casing.

11. The flexible battery of claim 1, wherein the internal pressure of the flexible battery is the same as the surrounding air pressure.

12. The flexible battery of claim 1, further comprising a separator between the negative electrode and the positive electrode.

13. The flexible battery of claim 12, wherein the first polymer film is at least partially adhered to the separator.

14. The flexible battery of claim 1, wherein the first polymer film has a thickness in the range of about 1 to about 50 micrometers.

15. The flexible battery of claim 1, wherein the first polymer film comprises a thermoplastic resin having a melting point in the range of about 70 to about 200° C.

16. The flexible battery of claim 15, wherein the first polymer film further comprises an elongated film.

17. The flexible battery of claim 15, wherein the first polymer film comprises a polypropylene resin.

18. The flexible battery of claim 1, wherein the first polymer film is laminated on a surface of at least one of the negative electrode and the positive electrode.

19. A flexible battery comprising:
a cell stack comprising a plurality of unit cells, wherein each of the unit cells comprises:
  a negative electrode,
  a positive electrode,
  an electrolyte layer disposed between the negative electrode and the positive electrode, and
  a first polymer film surrounding the negative electrode, the positive electrode, or the electrolyte layer; and
an external casing sealing the cell stack,
wherein the plurality of unit cells are in sliding contact with each other, and
wherein the flexible battery has a flexibility of a curvature radius of 50 mm and has a capacity retention of at least 98.3% after 100 bending cycles over a cylinder having a diameter of 100 mm.

20. A flexible battery comprising:
a cell stack comprising a plurality of unit cells, wherein each of the unit cells comprises:
  a negative electrode,
  a positive electrode,
  an electrolyte layer disposed between the negative electrode and the positive electrode, and
  a first polymer film surrounding the negative electrode, the positive electrode, or the electrolyte layer; and
an external casing sealing the cell stack,
wherein the plurality of unit cells are in sliding contact with each other, and
wherein the flexible battery has a capacity retention of at least 98.3% after 100 bending cycles over a cylinder having a diameter of 100 mm.

21. An electronic device comprising:
a flexible battery having a cell stack and an external casing sealing the cell stack,
wherein the cell stack includes a plurality of unit cells, and each of the unit cells comprises:
  a negative electrode,
  a positive electrode,
  an electrolyte layer disposed between the negative electrode and the positive electrode, and
  a first polymer film surrounding the negative electrode, the positive electrode, or the electrolyte layer;
wherein the plurality of unit cells are in sliding contact with each other; and
wherein
  the flexible battery has a flexibility of 11 mm to 13 mm when a 12 mm by 42 mm portion is deflected under a 17 g load,
  the flexible battery has a flexibility of the curvature radius of 50 mm, and
  the flexible battery has a capacity retention of at least 98.3% after 100 bending cycles over a cylinder having a diameter of 100 mm.

* * * * *